United States Patent Office 3,635,880
Patented Jan. 18, 1972

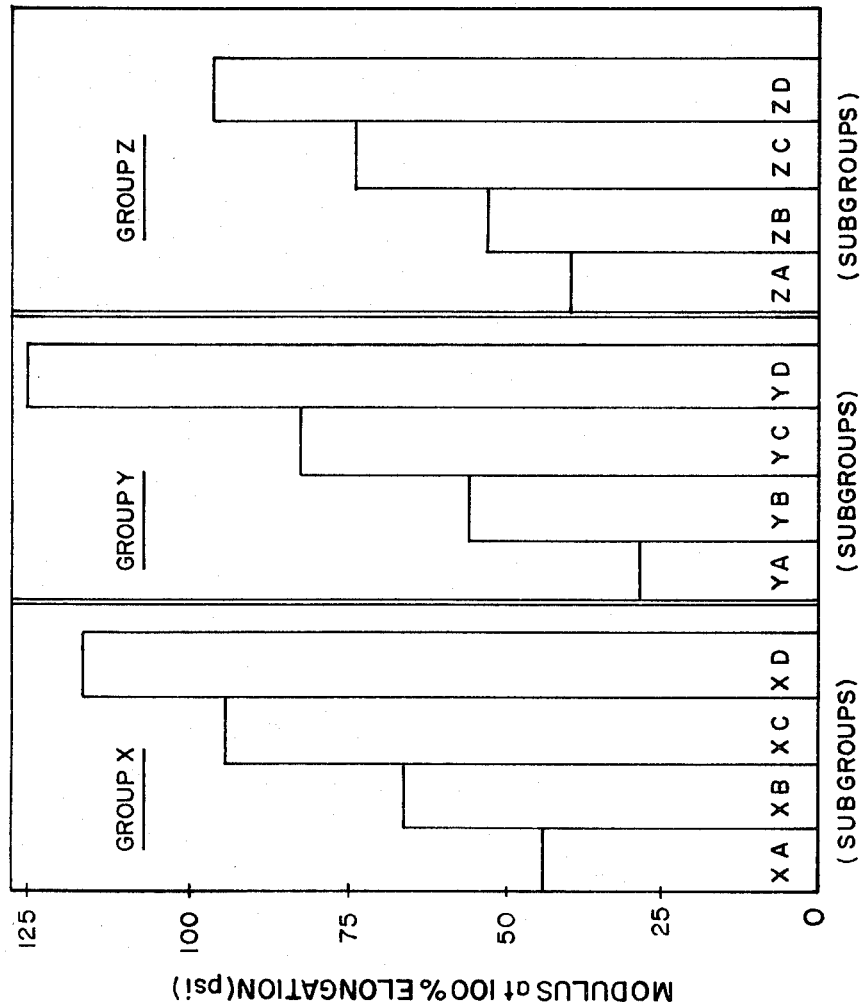

3,635,880
CURABLE COMPOSITIONS FOR MAKING HIGH TEMPERATURE STABLE CURED —SH TERMINATED POLYSULFIDE POLYMER
Osvaldo Lamboy and Daniel J. Smith, Morrisville, Pa., assignors to Thiokol Chemical Corporation, Bristol, Pa.
Filed Nov. 10, 1969, Ser. No. 875,008
Int. Cl. C08f 45/54; C08g 51/54
U.S. Cl. 260—45.7
21 Claims

ABSTRACT OF THE DISCLOSURE

An alkaline earth metal oxide, e.g. magnesium oxide, is essentially included in a curable polymeric composition comprising in admixture —SH terminated liquid organic polysulfide polymer, organic peroxide and cupric abietate or 2,4,6-tri(dimethylaminomethyl)phenol, thereby rendering the cured elastomeric product formed upon curing the curable composition stable at temperatures in the range from about 150° to 300° F.

BACKGROUND OF THE INVENTION

Field of the invention

This invention relates to curable compositions based upon —SH terminated liquid organic polysulfide polymers. Particularly, it relates to such curable compositions which, when cured, provide an elastomeric product which is stable against degradation by heat at high temperatures, i.e. temperatures in the range from about 150° to 300° F. The elastomeric product may be used in the form of an architectural or highway sealant, a membrane, a sheathing, a wire coating, or the like, and is especially advantageous in applications where higher than normal atmospheric temperatures may be encountered.

DESCRIPTION OF THE PRIOR ART

Liquid polysulfide polymers of the type disclosed in the Patrick and Ferguson patent, U.S. 2,466,963, and used in the practice of the present invention, are now well known and have been extensively used for a variety of commercial applications. When cured to form rubber-like solids, they possess a number of commercially important properties. They are inert to oil, most solvents, water and mild acids and alkalies, as well as to ozone and sunlight. They are tough and resilient and retain their flexibility at extremely low temperatures. Moreover, they are impermeable to gases and moisture and are capable of adhering tenaciously to such diverse materials as glass, metals, plastics, wood, leather and fabrics. Because of these valuable properties they have been extensively used as impregnating, sealing, caulking, and coating materials as well as for a variety of special uses such as gasoline hose, printing rolls and potting compounds for electrical components.

Although the cured polymers have found wide utility at normal ambient temperature conditions, the cured polymers have not been useful when subjected to high temperatures for prolonged periods of time, especially at temperatures above about 150° F.

Cured polymers made from compositions of liquid organic polysulfide polymers admixed with inorganic peroxide curing agents, e.g. lead peroxide, have been found to degrade rapidly when held at 250° F. for two weeks. Similarly, cured polymers made from compositions of liquid organic polysulfide polymers admixed with organic peroxide curing agents, e.g. cumene hydroperoxide, while more stable than those cured with inorganic peroxides, have been found to have poor stability when held at 250° F. for two weeks. The poor stability is evidenced by the decrease in physical property values under standard test conditions.

Liquid organic polysulfide polymers are characterized by the fact that they have recurring polysulfide linkages between organic radicals having at least two primary carbon atoms for connection to disulfide linkages. Thus, for example, disulfide polymers have a general structure corresponding to the formula

HS(RSS)$_x$RSH in which the R's are organic polyvalent radicals, preferably predominantly divalent alkylene oxahydrocarbon or thiahydrocarbon radicals such as diethyl formal radicals, and $x$ is a number greater than one which may vary from a relatively small number in the case of liquid polymers having a molecular weight of about 500 to 12,000, e.g., about 3 to 100 where R is $\text{(CH}_2\text{CH}_2\text{)}$, to a relatively large number in the case of solid polymers which may have a molecular weight of about 100,000 to several million. The low molecular weight polysulfide polymers, e.g., 500 to 12,000 M.W., are normally at 25° C. and are preferably formed by reaction of an organic dihalide with a backbone corresponding to R with an inorganic polysulfide, such as $\text{Na}_2\text{S}_y$, $y$ usually being greater than two. Solid organic polysulfide polymers are produced thereby which may then be split according to the method of Patrick and Ferguson in U.S. 2,466,963 to provide liquid polysulfide polymers. The present invention concerns the curing of such liquid polymers, and in particular their controlled curing and stabilization when an organic peroxide is used as the curing agent, and the cured product is subjected to temperatures higher than the usual temperatures at which commercial cured organic polysulfide polymers have heretofore been found useful.

Methods and formulations for effecting the curing, or vulcanization, of liquid organic polysulfide polymers by means of organic peroxide curing agent systems are known. One such system is taught in Sorg and Kutch Patent, U.S. 2,933,470. Utilization of such a system is also disclosed in John and Pettit Patent U.S. 3,022,870. In each of these patents, a mixture of a finely-divided silica and cumene hydroperoxide, or an equivalent organic peroxide curing agent, is modified with maleic anhydride, or an equivalent adhesion-imparting acidic material to provide, when used to cure —SH terminated liquid polysulfide polymer, an adhesive pre-cured composition, or even a film of pre-cured adhesive material, which cures to a permanently flexible, tough, strong, adherent, solvent-resistant and pressure-resistant cured polysulfide polymer. However, the working life of such a pre-cured composition is relatively short. Thus, the composition cures in about 2 hours to a non-spreadable state. Thereafter, the composition rapidly cures to an effectively non-plastic state, with curing complete in about 12 hours at normal room temperatures. The curing reaction proceeds rapidly at temperatures as low as atmospheric temperatures, and hence, as Sorg and Kutch, above, teach the cumene hydroperoxide curing agent of the prior art compositions should not be added until immediately before the composition is to be applied to a surface to be coated.

The use of a large variety of copper salts in a polar liquid in combination with orthoanisole as a cure stabilizer and regulating composition for curable systems comprising liquid organic polysulfides and metal oxide curing agents, in the form of the peroxide of the metal, is disclosed in Giordano Patent, U.S. 3,349,057. Such use is taught to enhance the consistency and stability of the precured liquid polysulfide polymer and to render the precured composition less sensitive to changes in amounts of other recipe ingredients used. According to the patent, the copper salts are used in an amount of at least 0.005 part by weight of copper per 100 parts of liquid polysulfide polymer. As taught by Giordano, the working life of his precured liquid polysulfide polymer compositions varies widely with a constant amount of his copper salt when other ingredients are changed or modified in quantity.

The use of cupric abietate and organic peroxides in admixture with liquid polysulfide polymers is taught in the copending application of Julian A. Panek and Osvaldo Lamboy, Ser. No. 766,017 filed Sept. 30, 1968, now U.S. Pat. 3,505,258. Panek et al. disclose and claim a method and means for extending the working life of a precured liquid organic polysulfide polymer mixture while maintaining a practical cure life.

SUMMARY OF THE INVENTION

The present invention is directed to providing a cured —SH terminated liquid organic polysulfide polymer system which retains good physical properties, such as, modulus, tensile strength, elongation and Durometer hardness, even when subjected to temperatures of 250° F. or higher for two weeks.

According to the present invention, it has been found that retention of good physical properties in a cured organic polysulfide polymer system in high temperature service is obtained by curing the —SH terminated liquid organic polysulfide polymer system from which the cured product is made with an organic peroxide curing agent selected from cumene hydroperoxide, tertiary butyl hydroperoxide, 2,5 - dimethylhexane-2,5-dihydroperoxide or 2,5-dimethyl-2,5 - di(benzoylperoxyl)hexane in the presence of an activating amount of an activator selected from cupric abietate and 2,4,6-tri(dimethylaminomethyl) phenol, and essentially, a physical properties stabilizing amount of an alkaline earth metal oxide, e.g. magnesium oxide, calcium oxide, barium oxide or strontium oxide. The physical properties stabilizing amount of the alkaline earth metal oxide may be expressed as ranging from about 0.5 to about 5 parts by weight of the metal oxide per 100 parts by weight of the liquid organic polysulfide polymer.

More specifically, the invention comprises physical properties stabilizer containing, two-part, organic peroxide curable, compositions of —SH terminated liquid organic polysulfide polymers wherein each of said polysulfide polymers has the formula $HS(RSS)_xRSH$ and wherein R is a divalent aliphatic radical selected from the group consisting of alkylene, oxahydrocarbon and thiahydrocarbon radicals, preferably $(C_2H_4—OCH_2—OC_2H_4)$, and $x$ is a number between 3 and 100, preferably between about 23 and 46, the compositions comprising in admixture in parts by weight per 100 parts of said polymer of physical properties stabilizing agent consisting of from about 0.5 to about 5 parts of MO, wherein M represents calcium, magnesium, strontium or barium; an activating amount of an activator selected from cupric abietate and 2,4,6 - tri(dimethylaminomethyl)phenol, and a curing amount of one of the above mentioned organic peroxides.

TABLE 1.—COMPOSITION GROUPS AND SUBGROUPS

| | Group X | | | | Group Y | | | | Group Z | | | |
|---|---|---|---|---|---|---|---|---|---|---|---|---|
| Subgroups | A | B | C | D | A | B | C | D | A | B | C | D |
| Ingredients (parts by weight, p.b.w.): | | | | | | | | | | | | |
| LP-32 (—SH terminated liquid polysulfide polymer) | 100 | 100 | 100 | 100 | 100 | 100 | 100 | 100 | 100 | 100 | 100 | 100 |
| Multifex M-M (precipitated CaCO₃) | 30 | 30 | 30 | 30 | 30 | 30 | 30 | 30 | 30 | 30 | 30 | 30 |
| Aroclor 1254 (chlorinated diphenyl) | 7.8 | 7.8 | 7.8 | 7.8 | 7.8 | 7.8 | 7.8 | 7.8 | 7.8 | 2.8 | 7.8 | 7.8 |
| Cumene hydroperoxide | 8.0 | 8.0 | 8.0 | 8.0 | | | | | | | | |
| t-Butyl hydroperoxide | | | | | 6.4 | 6.4 | 6.4 | 6.4 | | | | |
| 2,5-dimethylhexane-2,5-dihydroperoxide | | | | | | | | | 4.2 | 4.2 | 4.2 | 4.2 |
| EH 330 (2,4,6-tri(dimethylaminomethyl)phenol) | | 0.5 | 0.5 | | | 0.5 | 0.5 | | | 0.5 | 0.5 | |
| Cupric abietate (1% solution in Santicizer 160-butyl benzyl phthalate) | 0.5 | | | 0.5 | 0.5 | | | 0.5 | 0.5 | | | 0.5 |
| Magnesium oxide | | | 3.0 | 3.0 | | | 3.0 | 3.0 | | | 3.0 | 3.0 |

TABLE 2.—GROUP X PHYSICAL TEST RESULTS

| Subgroups | A | B | C | D |
|---|---|---|---|---|
| Original properties: | | | | |
| Modulus, p.s.i.: | | | | |
| 100% | 56 | 56 | 76 | 97 |
| 300% | 111 | 67 | 126 | 181 |
| 500% | 157 | 119 | 163 | |
| Tensile, p.s.i. | 150 | 174 | 209 | 240 |
| Elongation, percent | 623 | 830 | 693 | 483 |
| Durometer hardness | 30 | 32 | 36 | 39 |
| 1 week at 250° F.: | | | | |
| Modulus, p.s.i.: | | | | |
| 100% | 56 | 80 | 99 | 118 |
| 300% | 111 | 146 | 203 | 246 |
| 500% | 158 | 202 | 281 | 328 |
| Tensile, p.s.i. | 236 | 205 | 360 | 348 |
| Elongation, percent | 830 | 763 | 765 | 553 |
| Durometer hardness | 30 | 38 | 42 | 45 |
| 2 weeks at 250° F.: | | | | |
| Modulus, p.s.i.: | | | | |
| 100% | 44 | 67 | 95 | 117 |
| 300% | 90 | 126 | 196 | 242 |
| 500% | 130 | 173 | 278 | |
| Tensile, p.s.i. | 181 | 231 | 331 | 373 |
| Elongation, percent | 767 | 757 | 703 | 470 |
| Durometer hardness | 26 | 34 | 39 | 43 |
| 1 week at 300° F.: | | | | |
| Modulus, p.s.i.: | | | | |
| 100% | 68 | 30 | 141 | 151 |
| 300% | 152 | 82 | | |
| 500% | | | | |
| Tensile, p.s.i. | 172 | 117 | 197 | 196 |
| Elongation, percent | 337 | 436 | 163 | 150 |
| Durometer hardness | 27 | 14 | 41 | 45 |

TABLE 3.—GROUP Y PHYSICAL TEST RESULTS

| Subgroups | A | B | C | D |
|---|---|---|---|---|
| Original properties: | | | | |
| Modulus, p.s.i.: | | | | |
| 100% | 35 | 73 | 78 | 97 |
| 300% | 61 | 118 | 133 | |
| 500% | 83 | 148 | 171 | |
| Tensile, p.s.i. | 145 | 180 | 224 | 165 |
| Elongation, percent | 887 | 670 | 797 | 267 |
| Durometer hardness | 22 | 37 | 37 | 40 |
| 1 week at 250° F.: | | | | |
| Modulus, p.s.i.: | | | | |
| 100% | 41 | 65 | 91 | 114 |
| 300% | 75 | 122 | 179 | 228 |
| 500% | 107 | 181 | 266 | 305 |
| Tensile, p.s.i. | 215 | 250 | 368 | 327 |
| Elongation, percent | 953 | 890 | 810 | 560 |
| Durometer hardness | 27 | 34 | 41 | 44 |
| 2 weeks at 250° F.: | | | | |
| Modulus, p.s.i.: | | | | |
| 100% | 28 | 56 | 83 | 125 |
| 300% | 53 | 106 | 168 | 249 |
| 500% | 77 | 153 | 244 | 318 |
| Tensile, p.s.i. | 153 | 245 | 347 | 328 |
| Elongation, percent | 1,047 | 897 | 837 | 537 |
| Durometer hardness | 19 | 32 | 39 | 46 |
| 1 week at 300° F.: | | | | |
| Modulus, p.s.i.: | | | | |
| 100% | 34 | 30 | 129 | 141 |
| 300% | 72 | 78 | | |
| 500% | 110 | 134 | | |
| Tensile, p.s.i. | 173 | 140 | 257 | 228 |
| Elongation, percent | 843 | 527 | 220 | 172 |
| Durometer hardness | 23 | 15 | 40 | 44 |

TABLE 4.—GROUP Z PHYSICAL TEST RESULTS

| Subgroups | A | B | C | D |
|---|---|---|---|---|
| Original properties: | | | | |
| Modulus, p.s.i.: | | | | |
| 100% | 74 | 58 | 76 | 93 |
| 300% | 131 | 74 | 124 | 160 |
| 500% | 175 | 118 | 160 | |
| Tensile, p.s.i. | 198 | 174 | 208 | 203 |
| Elongation, percent | 543 | 733 | 750 | 390 |
| Durometer hardness | 37 | 35 | 42 | 43 |
| 1 week at 250° F.: | | | | |
| Modulus, p.s.i.: | | | | |
| 100% | 51 | 55 | 73 | 106 |
| 300% | 99 | 103 | 143 | 212 |
| 500% | 143 | 150 | 215 | 287 |
| Tensile, p.s.i. | 223 | 236 | 346 | 342 |
| Elongation, percent | 907 | 870 | 923 | 700 |
| Durometer hardness | 30 | 30 | 37 | 43 |
| 2 weeks at 250° F.: | | | | |
| Modulus, p.s.i.: | | | | |
| 100% | 40 | 53 | 75 | 96 |
| 300% | 76 | 101 | 159 | 195 |
| 500% | 113 | 149 | 221 | 256 |
| Tensile, p.s.i. | 182 | 238 | 314 | 279 |
| Elongation, percent | 920 | 887 | 830 | 573 |
| Durometer hardness | 27 | 31 | 35 | 43 |
| 1 week at 300° F.: | | | | |
| Modulus, p.s.i.: | | | | |
| 100% | 45 | 43 | 122 | 145 |
| 300% | 104 | 111 | | |
| 500% | | | 157 | |
| Tensile, p.s.i. | 192 | 152 | 170 | 223 |
| Elongation, percent | 670 | 403 | 123 | 175 |
| Durometer hardness | 23 | 21 | 41 | 43 |

BRIEF DESCRIPTION OF THE DRAWING

The drawing shows the advantageous improvement obtained in the moduli at 100% elongation after two weeks heating at 250° F. of test pieces of cured —SH terminated liquid organic polysulfide polymer systems by addition of magnesium oxide as a stabilizer agent to the admixed uncured polymeric composition before curing the polymer system. Each test group, X, Y and Z, was prepared with a different organic peroxide. The moduli shown for each subgroup, A, B, C and D, are the averaged moduli of three test pieces of each subgroup. Test group X was compounded with cumene hydroperoxide as curing agent. Test group Y was compounded with t-butyl hydroperoxide as the curing agent. Test group Z was compounded with 2,5-dimethylhexane-2,5-dihydroperoxide as the curing agent. In each group, subgroup A was compounded with cupric abietate activator, and no magnesium oxide was used; subgroup B was compounded with 2,4,6-tri(dimethylaminomethyl)phenol activator (referred to as EH 330), and no magnesium oxide was used; subgroup C was compounded with EH 330 activator, and with 3 p.b.w. of magnesium oxide stabilizing agent; and subgroup D was compounded with cupric abietate activator, and with 3 p.b.w. magnesium oxide stabilizing agent. From the drawing, it is to be noted that whereas, in each group, subgroup test pieces containing EH 330 activator and no magnesium oxide have superior moduli, with each organic hydroperoxide curing agent, over the moduli of the subgroups containing cupric abietate and no magnesium oxide, the addition of magnesium oxide stabilizing agent to the compositions containing cupric abietate results in superior moduli in each such group even over subgroups containing EH 330 activator with magnesium oxide. The stabilizing effect of the alkaline earth metal oxide, magnesium oxide, thus, is shown to be particularly advantageous and beneficial when cupric abietate is present as the activator for the curing agent, although EH 330 is also advantageous and beneficial.

DESCRIPTION OF THE PREFERRED EMBODIMENTS

In order to more fully disclose and teach the invention, following are given specific examples which teach preferred embodiments of its practice.

While any of the —SH terminated liquid organic polysulfide polymers described above may be used in practice of the invention to obtain the high temperature physical properties advantages over the prior art compositions and systems, the invention is herein illustrated with the —SH terminated liquid organic polysulfide polymer, Thiokol LP–32, which has the formula $$HS(C_2H_4OCH_2OC_2H_4-SS)_{23}C_2H_4O-CH_2OC_2H_4-SH$$

and a molecular weight of 4000. Thiokol LP–32 is very similar in structure to Thiokol LP–31 and Thiokol LP–2 and any of these well-known and commercially available —SH terminated liquid organic polysulfide polymers readily can be obtained and used for practice of the invention.

The LP–32 was used to make curable polymeric compositions having the formulations shown in Table 1. Test groups X, Y and Z and subgroups A, B, C and D were formulated as shown. The composition differences between the groups and subgroups have been described in connection with the description of the drawing, supra. In compounding the mixtures, the —SH terminated liquid organic polysulfide polymer (LP–32) and the precipitated $CaCO_3$ were compounded as a first masterbatch from which each of the groups X, Y and Z was made. Stabilizing agent, i.e. magnesium oxide, was then added to one half of the first masterbatch to make a second masterbatch composition from which subgroups C and D in each group were prepared. The remainder of the first masterbatch was used to formulate subgroups A and B for each group. The masterbatches so formulated each represent a part A of a two part curable —SH terminated liquid organic polysulfide polymer system. Part B of each system was then made for each subgroup by admixing organic peroxide curing agent, plasticizer agent, i.e. Aroclor 1254, and activating agent, i.e., cupric abietate or EH 330.

Parts A and B for each system were prepared and then admixed in batches sufficient in size to make up four sets of test samples consisting of three test samples for each category of tests to be carried out. The test samples were cured by standing for 72 hours at room temperature (75° F.), then heated at 158° F. for 1½ hours and milled on a rubber mill. Test pieces were pressed out from the milled sheets under pressing conditions of ten minutes at 250–280° F. at 500 p.s.i. The physical properties of the first set of samples of each subgroup were then determined and identified as "original properties." Standard test procedures and standard test equipment plastics as provided for by the American Society for Testing Materials were used. The second set of samples of each subgroup was stored at 250° F. for one additional week and the physical properties were then determined. The third set of samples of each subgroup was stored at 250° F. for an additional week, i.e. a total of two weeks, and the physical properties were then determined. The fourth set of samples was stored at 300° F. for one week and the physical properties were then determined. In each case, the physical properties tested included moduli at 100%, 300% and 500% elongation, tensile strength, percent elongation and Durometer hardness. The test results from each of the three test samples in each set were averaged to obtain the reported results. The results are tabulated in Tables 2, 3 and 4.

Interpretation of the test results shown in Tables 2, 3 and 4 must be done with reliance on Table 1. Thus, Table 2 shows test results obtained using cumene hydroperoxide as the curing agent for the LP–32 liquid polysulfide polymer. Referring to Table 2, all the data, when read from left to right, show that cured elastomers of subgroups C and D, which were cured from compositions containing magnesium oxide stabilizing agent, have, in every case, superior moduli and tensile strengths to those of cured elastomers of subgroups A and B, which were cured without magnesium oxide stabilizing agent. The data also show that the products of subgroups C and D are less elastic and harder in Durometer rating than those of subgroups A and B.

When the data of Table 2 are read from top to bottom of the table, it is seen that the physical properties of the cured products of subgroups C and D after one week at 250° F., and even after one week at 300° F. are superior to the original physical properties of products of subgroups A and B.

Table 3 shows the test data obtained with LP-32 liquid polysulfide polymer cured with tertiary-butyl hydroperoxide and formulated in subgroups A, B, C and D in accordance with the compositions shown in Table 1. Again, it is seen that the presence of magnesium oxide in the formulations used to make the products tested in subgroups C and D is advantageous for obtaining and retaining superior physical properties in the cured products at temperatures in the range of 150° to 300° F.

Table 4 shows the test data obtained with LP-32 liquid polysulfide polymer cured with EH 330, i.e. 2,5-dimethylhexane - 2,5 - dihydroperoxide, and formulated in subgroups A, B, C and D in accordance with the compositions shown in Table 1. Here, too, the advantages of the presence of magnesium oxide in the curable compositions is shown.

When the data from Tables 2, 3 and 4 are compared against each other for corresponding subgroups, the comparisons shown that among the three organic peroxide curing agents used, after aging two weeks at 250° F., the —SH terminated liquid polysulfide polymer systems cured with tertiary-butyl hydroperoxide in the presence of cupric abietate activator and magnesium oxide stabilizing agent (subgroup D of group Y) provided the highest modulus at 100% elongation compared to subgroups D of groups X and Z. Similarly, the polymer systems cured with cumene hydroperoxide in the presence of EH 330 activator and magnesium oxide stabilizing agent (subgroup C of group X), after aging two weeks at 250° F., provided the highest modulus at 100% elongation compared to subgroups C of groups Y and Z.

From all the data it is shown that the optimum physical properties in cured product which has been heated two weeks at 250° F. is obtained when the product is made from a curable composition of LP-32 liquid polysulfide polymer which has been cured with tertiary-butyl hydroperoxide activated with cupric abietate and stabilized with magnesium oxide stabilizing agent.

The alkaline earth metal oxide stabilizing agent used in practicing the invention may be mixed into the other ingredients of the formulation for a particular curable —SH terminated liquid polysulfide polymer system at any stage of the compounding. However, the stabilizing agent preferably is compounded into a masterbatch part A of a two-part system along with the liquid polysulfide polymer in a known way. Similarly, the curing agent, the activating agent for the curing agent, and plasticizer may be compounded into a masterbatch part B. Fillers of various types, such as, clays; adhesive agents, such as, phenol-formaldehyde condensates; and other additives well-known in the elastomer and sealant compounding arts also may be used in the compositions provided that they are stable materials at the high temperatures for which the cured elastomer or sealant product made from the particular formulation is to be used. The alkaline earth metal oxide is preferably used in a finely-divided form which will permit homogeneous dispersion of the oxide throughout the composition when the ingredients are admixed. While the amount of alkaline earth metal oxide used preferably is about 3 p.b.w. per 100 p.b.w. of the liquid polysulfide polymer, an amount ranging from about 0.5 to 5.0 may be used while still obtaining the benefits of the invention. Higher amounts of the oxide are not additionally effective, and merely serve as a filler.

The cumene hydroperoxide used in practicing the invention may be the standard commercial product which comprises about 70% by weight cumene hydroperoxide with the remainder being other organic liquids, such as, alcohols and ketones. The parts of cumene hydroperoxide shown in Table 1 are in parts of such 70% by weight solution. The other organic peroxides which can be used most advantageously to practice the invention include commercial forms of tertiary butyl hydroperoxide, 2,5-dimethylhexane-2,5 - dihydroperoxide and 2,5-dimethyl-2,5-di(benzoylperoxyl)hexane, a peroxyester. The latter two compounds have available oxygen contents of 17.9% and 8.2%, respectively compared to 10.5% for cumene hydroperoxide. The amount of any one of the organic peroxides which is used can be readily determined to obtain the rate and the amount of cure desired. Usually, the amount will be about 3 to 10 p.b.w. per 100 p.b.w. of the —SH terminated liquid organic polysulfide polymer.

In formulations containing one of the latter two organic peroxides, the peroxide preferably is mixed with the plasticizer, e.g. Aroclor 1254 in a 1:2 ratio by weight.

The cupric abietate activating agent is a compound having the formula $Cu(C_{20}H_{29}O_2)_2$. It is used in its standard commercial form, which may be a copper resinate derived by treating rosin, which is predominantly abietic acid, with acetic acid, or by heating cupric hydroxide with abietic acid. The parts of cupric shown in Table 1 are in parts of such latter commercial material.

The activating agent EH 330 is a commercially available form of 2,4,6-tri(dimethylaminomethyl)phenol.

The cupric abietate and EH 330 preferably are dissolved and used, in practicing the invention, in a suitable organic solvent to make about a 1.0% by weight solution. Suitable solvents are alcohols, e.g. ethyl alcohol; hydrocarbon oils, e.g. naphtha; and ester plasticizers, e.g. Aroclor 1254, a chlorinated biphenyl, or Santicizer 160, which are preferred.

The amounts of activating agent which may be used is in the range of from about 0.00001 to about 1.0 p.b.w. per 100 p.b.w. of —SH terminated liquid organic polysulfide polymer. An amount of about 0.01 to 0.5 p.b.w. preferably is used.

The organic peroxide, in a solvent, may be mixed together with the Aroclor 1254 and used as a paste, with or without fillers of the same type as those which may be used in preparing part A compositions. The mixture, then is packaged separately as part B of a two-part system and is kept separate from the part A masterbatch ingredients in a two-part system, in a manner well-known in the art, and is mixed with the part A masterbatch ingredients at about the time of intended use. The alkaline earth metal oxide, however, should be used only in the part A masterbatch in order to avoid possible reaction with the organic peroxide.

Although the masterbatch compositions of Table 1 have been prepared without an adhesion additive present, it is to be understood that adhesion additives may be compounded into a particular composition to obtain organic polysulfide polymer vulcanizates having improved adherence to the surfaces to which the composition is to be applied and then cured. Such adhesion additives include phenol-formaldehyde condensates, maleic anhydride, and other equivalent adhesion imparting acidic materials, such as, dichloromaleic anhydride and itaconic anhydride, although somewhat higher proportions by weight are required of these compounds. Other adhesion additives which may advantageously be used are epoxy resins, epoxy silanes, mercaptosilanes, aminosilanes and coumarone indene resins.

Ingredients in the masterbatches may be varied by substitution of equivalent materials, as will be known by those skilled in the art, while still obtaining the advantages and benefits of the invention.

The precured compositions of this invention are especially useful for coating electrical wiring which is to be subjected to high temperature in service in control and communication applications, for example, in automotive, or other vehicular, wiring systems.

Although a preferred example of a preferred class of —SH terminated liquid polysulfide polymers has been used to illustrate the invention, it is to be understood that other —SH terminated liquid organic polymers may also be used to achieve the high temperature advantages and benefits thereof. Thus, especially good results may be obtained with —SH terminated liquid organic polymer having a polyetherpolyurethane backbone and with —SH terminated polymer having a polyether backbone. Such polymers are described in copending application Ser. No. 484,097, filed Aug. 31, 1965, now Pat. No. 3,446,780 incorporated herein by reference. A specific example is poly(ethylene adipate-propylene adipate)polyester urethane polymer prepared by reacting an ethylene adipate/propylene adipate polyester glycol having a weight ratio of approximately 4:1 of ethylene adipate units to propylene adipate units and a molecular weight of approximately 2,500 with toluene diisocyanate to form an NCO-terminated prepolymer, having a molecular weight of 2500, which is then reacted with an hydroxyalkylene mercaptan, e.g. hydroxy-ethylene-mercaptan, to form the —SH terminated polymer. Each of these —SH terminated polymers can be used to make a part A composition of a two part system which includes an alkaline earth metal oxide stabilizing agent in a high temperature physical properties stabilizing amount and which is cured with a part B composition which comprises an organic peroxide curing agent, and an activating agent selected from cupric abietate and 2,4,6 - tri(dimethylaminomethyl) phenol.

It is to be understood that although a two part system is preferred and necessary for storage and shipment of the stabilized —SH liquid polysulfide polymer system, all the ingredients of the system can be admixed immediately before use at the point of use, with the curing agent being added last.

We claim:
1. A method for stablilizing and curing an —SH terminated organic polymer for use in the temperature range from about 150° to about 300° F. wherein the polymer is a —SH terminated liquid organic polysulfide polymer having the formula HS($RSS$)$_x$RSH in which R is a divalent aliphatic radical selected from the group consisting of alkylene, oxahydrocarbon and thiahydrocarbon radicals and $x$ is a number in the range from 3 to 100, said method comprising admixing with said polymer of a curing amount of organic peroxide curing agent, an activating amount of activating agent selected from cupric abietate and 2,4,6-tri(dimethylamino methyl)phenol, and a physical properties stabilizing amount of an alkaline earth metal oxide having the formula MO, wherein M represents calcium, magnesium, strontium or barium and allowing the mixture to set to a cured form.

2. The method of claim 1 wherein the organic peroxide curing agent is selected from cumene hydroperoxide, tertiary buntyl hydroperoxide, 2,5-dimethylhexane-2,5-dihydroperoxide, and 2,5 - dimethyl-2,5-di(benzoylperoxyl) hexane.

3. The method of claim 1 wherein the oxide is magnesium oxide.

4. The method of claim 1 wherein the stabilizing amount of alkaline earth metal oxide ranges from about 0.5 to about 5 parts by weight per 100 parts by weight of the liquid organic polysulfide polymer.

5. The method of claim 1 wherein the activating agent is cupric abietate.

6. The method of claim 5 wherein the organic peroxide is tertiary-butyl hydroperoxide.

7. The method of claim 5 wherein the organic peroxide is 2,5-dimethylhexane-2,5-dihydroperoxide.

8. The method of claim 5 wherein the organic peroxide is cumene hydroperoxide.

9. The method of claim 1 wherein the activating agent is 2,4,6-tri(dimethylaminomethyl)phenol.

10. The method of claim 9 wherein the organic peroxide is cumene hydroperoxide.

11. The method of claim 10 wherein the organic peroxide is tertiary-butyl hydroperoxide.

12. The method of claim 10 wherein the organic peroxide is 2,5-dimethylhexane-2,5-dihydroperoxide.

13. A curable organic polysulfide polymer composition for forming a cured organic polysulfide elastomer which is stabilized for use in the high temperature range from about 150° to about 300° F., said composition comprising in uniform admixture
(a) an—SH terminated liquid organic polysulfide polymer having the formula HS($RSS$)$_x$RSH in which R is a divalent aliphatic radical selected from the group consisting of alkylene, oxahydrocarbon and thiahydrocarbon radicals, and $x$ is a number in the range from 3 to 100;
(b) a curing amount of curing agent for said polysulfide polymer selected from cumene hydrocarbon, tertiary-butyl hydroperoxide, 2,5-dimethylhexane - 2,5 - dihydroperoxide and 2,5-dimethyl-2,5-di(benzoylperoxyl)hexane;
(c) an activating amount of activating agent for said curing agent selected from cupric abietate and 2,4,6-tri(dimethylaminomethyl)phenol; and
(d) a high temperature physical properties stabilizing amount of an alkaline earth metal oxide having the formula MO, wherein M represents calcium, magnesium, strontium or barium.

14. A composition according to claim 13 wherein the —SH terminated liquid organic polysulfide has the formula

HS($C_2H_4OCH_2OC_2H_4$—SS)$_{23}C_2H_4OCH_2$—OC$_2$H$_4$—SH and a molecular weight of about 4000.

15. A composition according to claim 13 wherein the amount of alkaline earth metal oxide present in the composition ranges from about 0.5 to about 5 parts by weight per 100 parts by weight of the polysulfide polymer.

16. A composition according to claim 13 wherein the organic peroxide is tertiary-butyl hydroperoxide, the activating agent is cupric abietate and the alkaline earth metal oxide is magnesium oxide.

17. A composition according to claim 13 wherein the organic peroxide is 2,5 - dimethylhexane-2,5-dihydroperoxide, the activating agent is cupric abietate, and the alkaline earth metal oxide is magnesium oxide.

18. A composition according to claim 13 wherein the organic peroxide is cumene hydroperoxide, the activating agent is cupric abietate, and the alkaline earth metal oxide is magnesium oxide.

19. A composition according to claim 13 wherein the organic peroxide is cumene hydroperoxide, the activating agent is 2,4,6-tri(dimethylaminomethyl)phenol, and the alkaline earth metal oxide is magnesium oxide.

20. A composition according to claim 13 wherein the organic peroxide is tertiary-butyl hydroperoxide, the activating agent is 2,4,6 - tri(dimethylaminomethyl)phenol, and the alkaline earth metal oxide is magnesium oxide.

21. A composition according to claim 13 wherein the organic peroxide is 2,5 - dimethylhexane-2,5-dihydroperoxide, the activating agent is 2,4,6-tri(dimethylaminomethyl)phenol, and the alkaline earth oxide is magnesium oxide.

References Cited
UNITED STATES PATENTS 3,225,017  12/1965  Seegman _____ 260—79.1
3,349,047  10/1967  Sheard _____ 260—18
3,505,258   4/1970  Panek et al. _____ 260—24

DONALD E. CZAJA, Primary Examiner

M. I. MARQUIS, Assistant Examiner

U.S. Cl. X.R.

117—124 E, 135.1, 138.8 R, 139.5 R, 142 R, 148 R; 260—33.8 R, 37 R, 79 R, 79.1 R, 829 R, 830 S